United States Patent [19]

Liebel et al.

[11] 4,300,864
[45] Nov. 17, 1981

[54] FREESTANDING HONEYCOMB LOAD SPACER

[75] Inventors: Henry L. Liebel; Martin Krier, both of Cincinnati, Ohio

[73] Assignee: Angleboard Inc., Cincinnati, Ohio

[21] Appl. No.: 100,338

[22] Filed: Dec. 5, 1979

[51] Int. Cl.³ .................... B60P 7/16; B61D 45/00; B65G 1/14
[52] U.S. Cl. .................. 410/154; 206/583; 410/122; 410/155
[58] Field of Search ............... 206/583; 410/121, 122, 410/129, 140, 154, 155

[56] References Cited

U.S. PATENT DOCUMENTS

| | | | |
|---|---|---|---|
| 3,405,659 | 10/1968 | Hees | 410/154 |
| 3,593,671 | 7/1971 | Bramlett | 410/154 |
| 3,618,535 | 11/1971 | Hees | 410/154 |
| 3,823,675 | 7/1974 | Farley | 206/583 X |
| 3,827,757 | 10/1974 | Kinnune, Jr. | 410/155 X |
| 3,850,112 | 11/1975 | Jaski | 410/154 |
| 3,862,607 | 1/1975 | Loudin | 410/154 X |
| 3,985,242 | 10/1976 | Schlaeger | 410/121 |

Primary Examiner—Joseph F. Peters, Jr.
Assistant Examiner—Howard Beltran
Attorney, Agent, or Firm—Wood, Herron & Evans

[57] ABSTRACT

A load spacer is disclosed having an improved support system allowing the spacer to stand between containers or articles of freight in a railway boxcar or other freight shipping vehicle or container and between the load and the walls of the shipping vehicle to prevent shifting of the load. The load spacer is an expandable-collapsible honeycomb structure and includes spaced elongated, rigid supporting members which extend through the structure from top to bottom. The ends of the rigid supporting members bear against the top and bottom strips of the structure to support the structure in an expanded condition and to prevent its collapse in a vertical direction when in place. The load spacer is particularly adapted for use at the ends and along the sides of the shipping vehicle.

10 Claims, 5 Drawing Figures

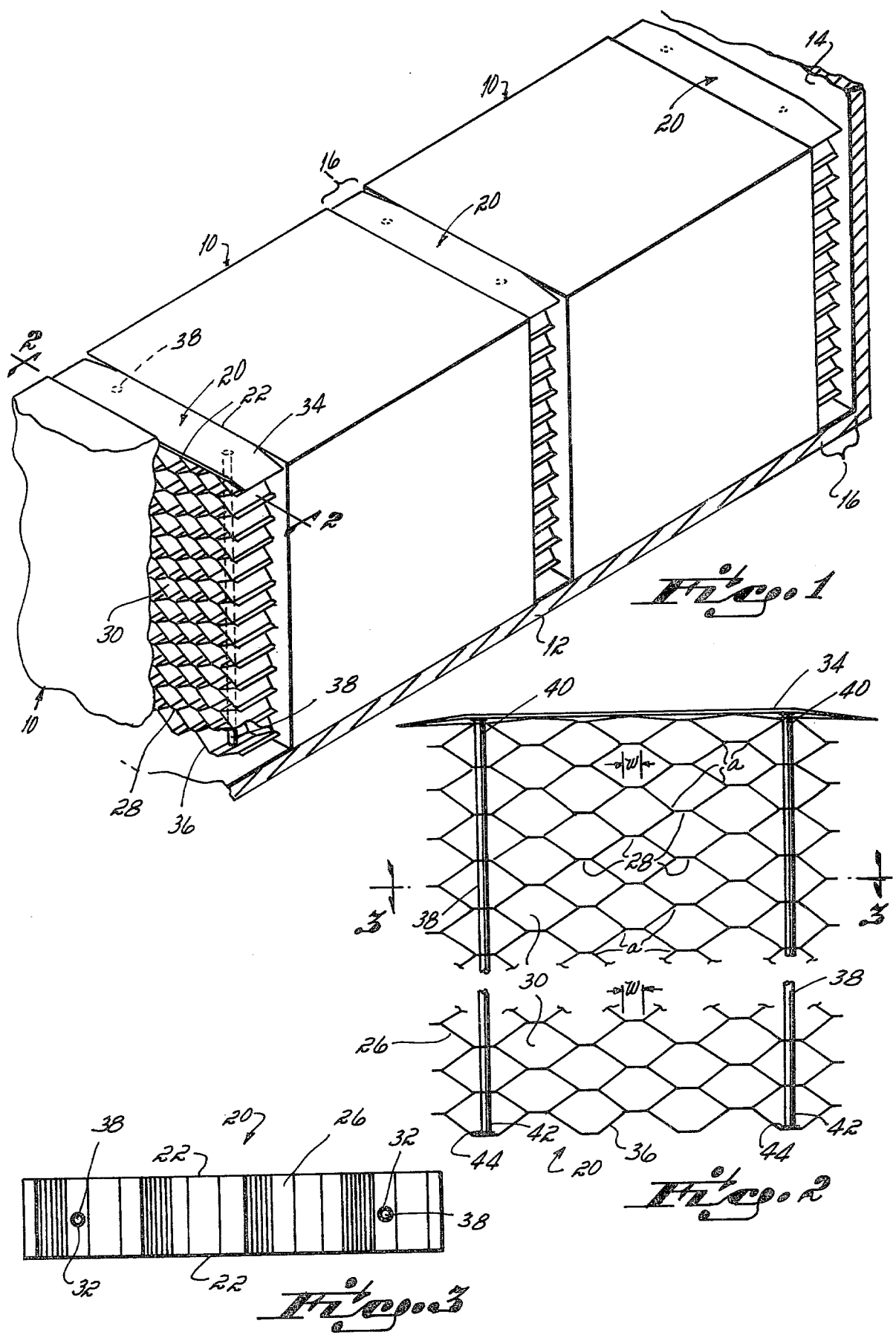

FREESTANDING HONEYCOMB LOAD SPACER

BACKGROUND OF THE INVENTION

This invention relates to a load spacer for use between adjacent articles or containers of freight in a shipping vehicle which may be collapsed to a compact package for shipment or storage but can be readily expanded for use. More particularly, this invention relates to a load spacer which is freestanding between the articles of freight and between the articles of freight and the walls of the shipping vehicle.

In the loading of a freight container, such as a railway boxcar or other shipping vehicle or container, it frequently happens that the loads placed therein do not completely fill up the available storage space. Thus, there are left one or more vertical spaces between closely spaced, adjacent unit loads of goods or between the load and the walls of the shipping container. These spaces should be filled to prevent side shifting of the load during transit which could cause damage to the load. Moreover, in some applications, it is desirable to separate the load from the walls of the shipping container to prevent the load from contacting the walls of the container. For example, when shipping goods in paper bags or like paper containers, e.g., bags of cement loaded in railway boxcars, the bags can be torn by the rough walls of the boxcars allowing the contents of the bags to spill. Thus, the load should be spaced from the walls of the shipping vehicle to prevent damage to the containers and to the load.

Prior to the present invention, various forms of load spacers or void fillers have been proposed for filling the spaces between adjacent unit loads of goods. One particular form of load spacer is a collapsible honeycomb structure in which a stack of rectangular strips of sheet material, for example, corrugated paperboard, are glued to adjacent strips at spaced and staggered positions such that when expanded the strips define a honeycomb having a plurality of cells. These prior art load spacers typically include one or more elongated, relatively rigid suspension members extending transversely of the honeycomb structure with the ends of the suspension members extending laterally beyond the planar sides of the structure. In use, the suspension members bridge the space and rest on the tops of the spaced loads. The spacer hangs from the suspension members between the pair of spaced apart articles of freight and expands downwardly between the articles under its own weight or it is pulled downwardly toward the bottom of the stack. When no longer needed, the load spacer may then be removed and stored in a collapsed condition for later use. Patents representative of this state of the art include U.S. Pat. Nos. 3,862,607, 3,842,757, 3,823,675, 3,618,535 and 3,593,671.

Exemplary of the prior art methods of suspending the load spacer between the articles of freight are U.S. Pat. Nos. 3,618,535 and 3,593,671, where it is suggested that wooden slats be riveted to the upper or top strip of sheet material so that they may be swung to lie either between the lateral confines of the spacer or transversely of the structure. When swung to lie transversely of the structure, the opposed ends of the slats extend laterally beyond the sides of the spacer to provide bearing surfaces for supporting the spacer from the tops of the spaced loads. Since the suspension members, although pivotable about the rivets, cannot be moved in a direction transverse to the sides of the spacer, it is impossible to suspend the spacer from an end or side load by cantilevering one end of the suspension members from the top of the load of freight as would be required in suspending the spacer between the load and the end or side walls of the freight container. Another form of suspension system illustrated in U.S. Pat. No. 3,842,757 involves the use of two pieces of wood such as pieces of wood lath which are inserted through the honeycomb cells beneath the top strip of sheet material. In this construction, it is not practicable to suspend the spacer at the ends or along the sides of the load because the wood lath cannot be cantilevered from the load without attaching it to the top of the load by some means. This is inefficient at best and may not always be possible.

Other suspension systems are illustrated in U.S. Pat. Nos. 3,862,607 and 3,823,765 wherein the suspension system includes a gimbal attached to the top sheet of the load spacer, for example, by means of pins or staples. Again, the use of these spacers around the periphery of the shipping vehicle is not practicable.

SUMMARY OF THE INVENTION

An objective of the present invention has been to provide an expandable load spacer which can be shipped in compacted form and readily converted to a freestanding spacer, i.e., one which is self-supporting in its expanded condition, thereby permitting its use between the ends and sides of the load and the walls of the shipping vehicle.

The load spacer of the present invention includes an expandable and collapsible honeycomb structure in combination with removable stretcher members which when inserted in an expanded honeycomb unit make it self-supporting and freestanding. The load spacer is constructed of a stack of rectangular strips of sheet material which are secured to adjacent strips at spaced and staggered positions such that the strips define a honeycomb structure having a plurality of cells when expanded. All of the strips except the top strip have a series of openings therethrough. The openings are preferably die cut through the sheet either at the glue lines joining the sheets or between the glue lines. These openings are spaced along the length of each strip with the openings in adjacent strips being axially aligned from top to bottom of the load spacer. Elongated, relatively rigid support or stretcher members such as paperboard tubes or strips of Masonite are insertable through the aligned openings from bottom to top until their ends contact the top strip. The openings in the bottom strip are then blocked off such that the ends of each support member bear against the top and bottom strips to expand the structure and prevent its collapse in use. In use, the bottom strip of the honeycomb structure rests on the floor of the shipping vehicle with the rigid support members extending generally vertically from top to bottom. The honeycomb structure supported as it is by the elongated support members is freestanding permitting it to be placed along the peripheral walls of the shipping vehicle after which the load is placed in the vehicle in abutment with the spacer. There is no need to suspend the load spacer of this invention from the load or to attach it to the load.

One significant disadvantage of prior art load spacers is that they are very difficult to expand in a vertical direction. That is, the sheet material used to make load spacers is typically relatively stiff. To use the spacer, it is therefore necessary for the user to physically expand the spacer so that it fills the entire height of the voids between loads.

It is an objective of the invention to overcome this disadvantage and to provide a load spacer which can readily be expanded and assembled with its stretcher members at the use site. To this end, the load spacer of the present invention is precreased to facilitate opening of the cells. This is accomplished by overstretching the load spacer as part of the manufacturing operation. This operation causes creases to form in the relatively stiff sheet material adjacent the glue lines securing the adjacent sheets. Thus, when the load spacer is expanded for insertion of the rigid support members, considerably less force is required to open the cells and the spacer can be assembled and the stretcher members inserted by a single workman.

One advantage of the present load spacer construction is that it substantially decreases the tendency of the load spacer to be deformed into an "hourglass" shape when it is hung. More particularly, it has been recognized that when a conventional honeycomb-type load spacer is supported from its upper edge between two adjacent loads, the honeycomb cells are stretched by the weight of the spacer and do not expand uniformly throughout the length of the spacer. Rather, the cells of the middle portion of the spacer tend to elongate to a greater degree than the cells at the top and bottom. As a consequence, the side edges of the spacer are drawn inwardly, giving the load spacer an overall "hourglass" shape. The problem which is thus created is that if the spacer is separating stacked articles, the narrow center portion of the load spacer may not engage and support all of the articles of a stack. U.S. Pat. No. 4,007,309 discloses one proposed solution to this problem involving the use of a series of stiff, horizontally disposed strips. However, this adds to both the weight and expense of the load spacer.

In accordance with the present invention, this deformation problem is substantially eliminated because all of the honeycomb cells of the spacer are forcibly expanded by the support stretchers which engage the top and bottom strips of the spacer and, hence, tend to expand the cells uniformly over the vertical length of the spacer. Moreover, the stretcher members act to a degree as vertical columns which tend to resist any bowing of the spacer. Since these stretchers replace the members conventionally employed to support the top of the spacer, they eliminate deformation without adding to the weight or expense of the unit.

These and other objectives and advantages of the invention will become more readily apparent from the following detailed description of the invention taken in conjunction with the accompanying drawings.

BRIEF DESCRIPTION OF THE DRAWINGS

FIG. 1 is a perspective view partly in section of a typical load arrangement illustrating the application of the load spacer of the present invention;

FIG. 2 is a fragmentary side view of the load spacer shown in FIG. 1 taken along line 2—2 of FIG. 1;

FIG. 3 is a cross-sectional view taken along line 3—3 of FIG. 2;

DETAILED DESCRIPTION OF THE INVENTION

Figure 4:
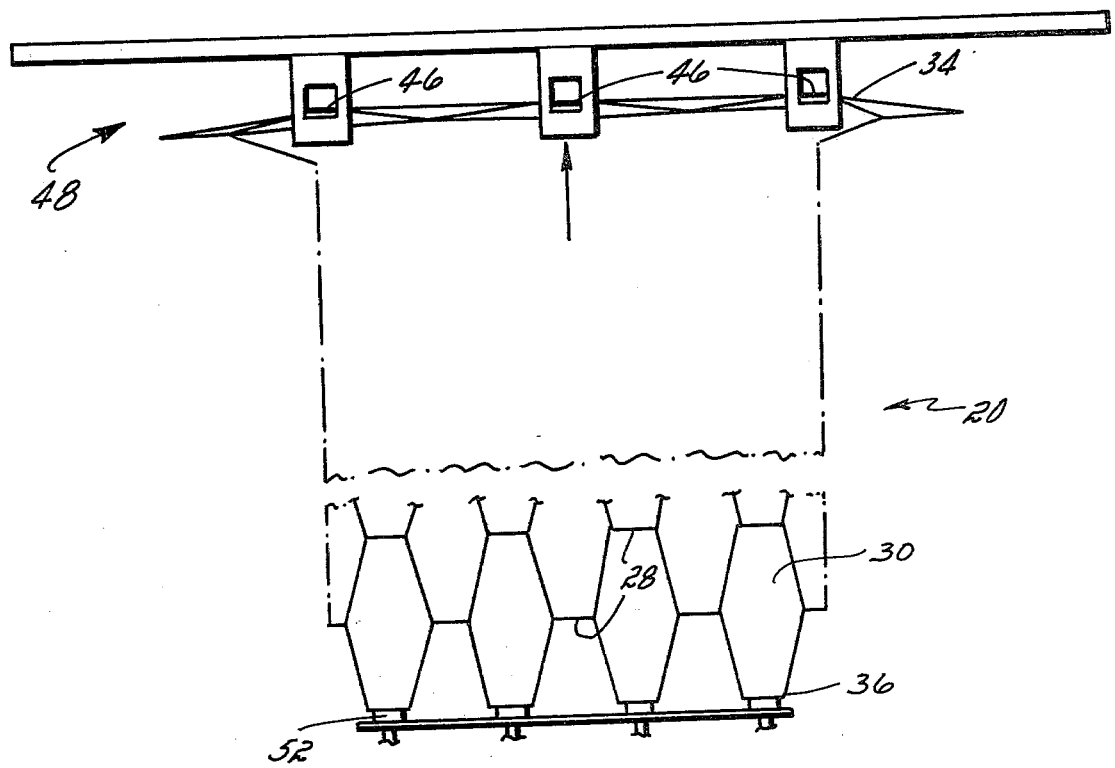
FIG. 4 is a side elevation view illustrating the apparatus for overstretching the load spacer.

Referring now to FIG. 1, in a typical load arrangement for shipping unit containers or articles of freight, stacks of articles of freight 10 are placed on the floor 12 of a freight shipping vehicle such as a railway boxcar having vertical end and side walls, a portion of one wall being designated in FIG. 1 by the number 14. The stacks 10 are separated from each other and from the walls 14 of the shipping container by spaces 16. The load spacer 20 is generally an expandable and collapsible honeycomb structure which is positioned in the spaces 16 between the spaced stacks of articles of freight 10 to prevent sideways shifting of the load. As shown in FIG. 1, the load spacer 20 is supported by the floor 12 of the shipping vehicle and stands between the adjacent loads 10 and between the loads 10 and the walls 14 of the shipping vehicle substantially filling the spaces 16 therebetween. As is well known, such honeycomb structures are very strong in a direction transverse to the planar sides 22 thereof.

Referring now in addition to FIGS. 2 and 3, the load spacer 20 is formed from a stack of rectangular strips of sheet material 26 which are secured to adjacent strips at spaced and staggered intervals, as at 28, as, for example, by gluing the strips together. The sheet material is preferably chipboard but may be other material, for example, paperboard either corrugated or uncorrugated. The width of the glue line is indicated by the designation "w" in FIG. 2. When the stack of strips of sheet material is expanded, the sheet material 26 therefore defines a vertical and horizontal array of adjacent cells 30 having a generally honeycomb cellular configuration. The number and size of strips used in the spacer is a matter of choice. Typically, a sufficient number of strips are used to permit the spacer to expand to fill a void 6 to 8 feet high. A convenient width is about 8 inches and a convenient length is about 48 inches.

Each strip is provided with holes 32 therethrough spaced along the length of the strip generally equidistant from the sides 22 of the strips. The holes in adjacent strips are axially aligned from the top strip 34 to the bottom strip 36 of the load spacer. An elongated, relatively rigid supporting member 38, for example, a paperboard tube or strip of Masonite or other suitable material, extends through the holes in the strips of sheet material between top strip 34 to bottom strip 36. Examples of suitable supporting members are a three-ply paper tube having a one inch outside diameter and a ¼ inch by 2½ inch Masonite strip. One end 40 of the supporting member 38 contacts the inner surface of the top strip 34 of the load spacer which, if desired, may be a double thickness of sheet material 26. The top strip 34, unlike the bottom strip 36 and intermediate strips, is not provided with holes. At the opposite end 42 of the supporting member 38, an insert 44 such as a piece of paper like that forming the strips 26 blocks off the hole 32 in the bottom strip 36. Thus, it may be appreciated that the supporting member 38 is insertable into the load spacer sequentially through the aligned holes 32 starting at the bottom strip 36 until the end 40 contacts the top strip 34. Thereafter, the insert 42 is placed in position to block the hole 32 in the bottom strip 36. The ends 40, 42 of the member 38 thus bear against the top and bottom sheets 34, 36, respectively, to maintain the load spacer in the expanded condition shown in FIGS. 1 and 2.

In FIGS. 1 and 2, two elongated members 38 are shown supporting the load spacer 20 in its expanded condition. It will be appreciated, however, that three or even more members may be employed as desired. This may depend on the length of the spacer as well as the materials of construction thereof. In addition, in the spacer shown in FIGS. 1 and 2, the holes 32 are located at the glue lines 28. Since the openings 32 are relatively small compared to the width of the load spacer, they do not materially detract from the strength of the bond. However, if desired, the openings could be placed between the glue lines. In this case, if a tube is employed as the supporting member, the openings must be elliptical in shape to form a circular opening in plan view when the spacer is expanded since the openings will then lie at an angle to the horizontal. It will, of course, be appreciated that any shape of opening and cross-sectional configuration for the rigid member 38 may be employed. Moreover, the openings 32 can be formed by die cutting; or, if circular openings are used, by drilling.

By virtue of the rigid members 38 extending through the load spacer between the top and bottom strips of sheet material, the spacer is expanded and may be placed in a vertical orientation as shown in FIGS. 1 and 2 without collapsing with the bottom 36 of the spacer resting on the floor 12. There is no need for any external devices to mount the load spacer either to or on the load or walls of the shipping vehicle. Thus, the load spacers may be placed around the periphery of the shipping vehicle after which the load is placed in the vehicle up against the spacer. The spacer prevents the load from shifting into the wall as well as prevents the load from contacting the walls which could possibly tear the load containers. The elongated members 38 may be removed from the load spacer 20 by removing the insert 44 to open the hole 32 in the bottom strip 36 and withdrawing the member out of the spacer. This permits the load spacer to be collapsed for shipment or storage and then expanded again, as desired, for use.

Referring now to FIG. 4, in the manufacture of the honeycomb structure, the stacks of rectangular strips of sheet material are glued together at spaced and staggered intervals as described above. Pieces of wood lath 46 are inserted transversely into cells 30 between the top strip 34 and the strip adjacent thereto such that the ends of the lath project laterally beyond the sides of the load spacer. Thereafter, the projecting ends of the wood lath members are fixed in a vertically movable jig 48. At the other end or bottom 36 of the spacer, a series of suction cups 52 are applied against the outer surface of the sheet material to hold the bottom in fixed position. The jig 48 is then moved upwardly to expand the honeycomb. The honeycomb structure is overexpanded by this method about 20 to 25% of its normal expanded height. That is, in a spacer designed for use in an 8 foot high space, the structure is overexpanded by about 2 feet, i.e., to a 10 foot height. This causes creases to form in the sheet material along the edges of the glue line 28 as indicated by "a" in FIGS. 2 and 4. Thus, the honeycomb structure of the present invention is actually prestretched and precreased so that it will readily expand for insertion of the elongated members 38 therein.

Figure 5:
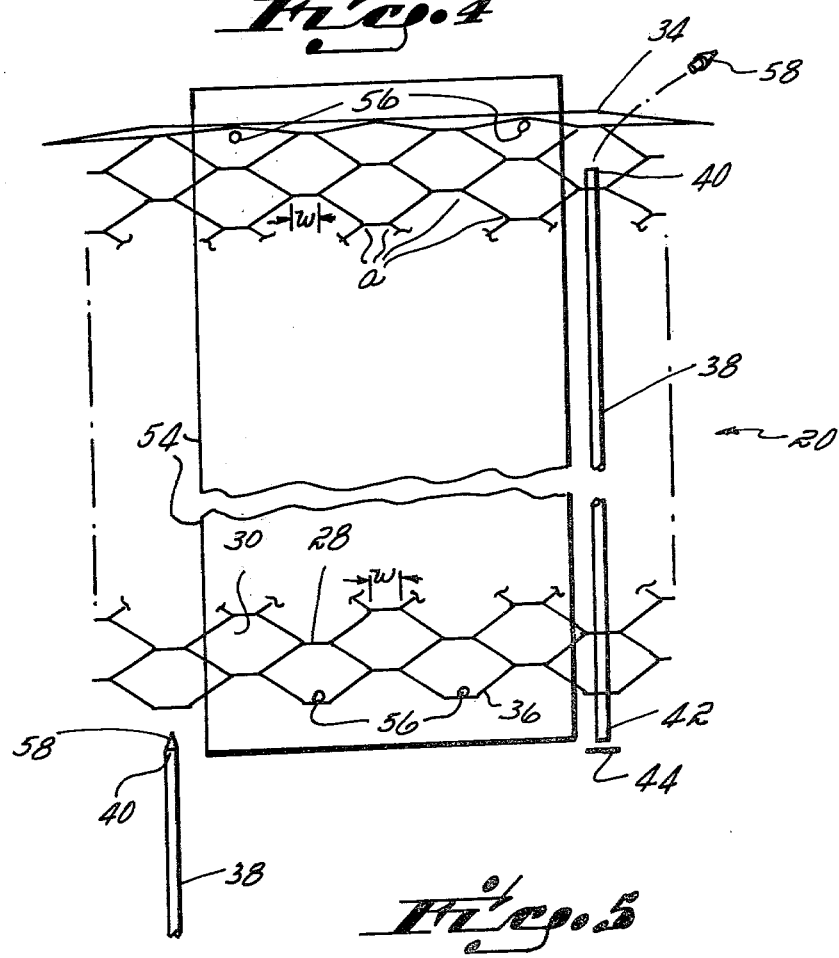
FIG. 5 is a top plan view illustrating a method for expanding and assembling the load spacer.

That assembly procedure is illustrated in FIG. 5. The load spacer is placed on a flat surface such as a 4 foot by 8 foot sheet of plywood 54 having pegs 56 projecting upwardly therefrom. The load spacer is placed edgewise on the surface with pegs extending into the cells 30 immediately below the top sheet. The spacer is then expanded until a pair of pegs at the other end of the board can be placed in the cells 30 adjacent the bottom sheet. The elongated members are now inserted through the openings 42 starting at the bottom sheet 36 and working toward the top sheet 34. On occasion, threading of the member through the openings may present some degree of difficulty because of the square end of the member 38. This difficulty may be overcome by mounting a cone-shaped member 58 on the end of the elongated member to lead the end through the openings. When the cone-shaped member 58 reaches the uppermost cell, the assembler removes it by placing his hand in the cell and pulling it off the end. The insert 44 is positioned to block the bottom opening. When all the members 38 have been inserted, the load spacer is removed from the board and is ready for use.

Although our invention has been described in terms of certain preferred embodiments, it will be understood that other forms may be adopted within the scope of out invention by those skilled in the art.

We claim:

1. A freestanding load spacer adapted to be disposed at the ends and sides of adjacent laterally spaced loads comprising:
   a cellular structure having a top, a bottom and generally planar sides, said structure having a plurality of cells arrayed from top to bottom and a plurality of openings therein between adjacent cells axially aligned from said top to said bottom, and
   an elongated, relatively rigid support member extending through said openings from top to bottom of said structure to support said structure in a vertical direction, and
   means supporting said cellular structure on said rigid support member.

2. A load spacer adapted to be removably placed between the ends and sides of adjacent laterally spaced loads comprising:
   an expandable-collapsible cellular structure including a stack of interconnected strips of rectangular sheet material defining a plurality of cells when expanded, said structure having a top strip, a bottom strip, generally planar sides and a plurality of openings in said sheet material axially aligned from top to bottom,
   an elongated, substantially rigid support member extending through said openings from said top strip to said bottom strip of said structure, said rigid support member supporting said structure in a vertical direction in the expanded condition of said load spacer such that said structure is essentially freestanding between said loads.

3. The load spacer of claim 2 wherein said strips are interconnected by glue lines extending transverse to the long edges of said top strip, and said openings are located on said glue lines.

4. The load spacer of claim 2 further comprising means for selectively closing off at least one of the topmost or bottommost openings to permit said member to be selectively inserted and withdrawn from said structure.

5. The load spacer of claim 2 wherein said rigid support member is a paper tube.

6. An expandable-collapsible cellular structure adapted to be removably placed between the ends and sides adjacent laterally spaced loads comprising:
   a stack of rectangular strips of sheet material including a pair of outer strips and a plurality of intermediate strips therebetween, said strips being interconnected at spaced and staggered positions such that the strips define a structure having a plurality of cells when expanded, each of said intermediate strips and at least one of said outer strips having an opening therethrough, said openings in adjacent strips being in axial alignment, an elongated, substantially rigid support member passing through said openings and extending between said outer strips, and means for sealing off said opening in said outer strip to retain the support member between said outer strips, said support member supporting said structure against collapse in a vertical direction such that said structure is essentially freestanding between said spaced loads.

7. The cellular structure of claim 6 further comprising a series of openings spaced along the length of each said intermediate strip and at least one of said outer strips and a plurality of spaced support members extending through said openings between said outer strips.

8. The cellular structure of claim 6 wherein the strips of sheet material are formed of chipboard and wherein said means for sealing off said opening in said outer sheet comprises a sheet of chipboard inserted between the inner surface of said outer sheet and the end of said support member.

9. The cellular structure of claim 8 wherein said strips are interconnected by glue lines and are precreased at the edges of said glue lines.

10. A freestanding load spacer comprising:

an expandable honeycomb structure having a pair of generally planar ends and sides, said structure having a plurality of cells when expanded, said cells having generally planar walls therebetween parallel to said planar ends, and openings in said walls axially aligned from end to end, and an elongated, relatively rigid support member extending through said openings between said ends to support said structure in an expanded condition such that said structure is essentially freestanding, and means supporting said cellular structure on said rigid support member.

* * * * *

UNITED STATES PATENT AND TRADEMARK OFFICE
CERTIFICATE OF CORRECTION

PATENT NO. : 4,300,864
DATED : November 17, 1981
INVENTOR(S) : Henry L. Liebel et al It is certified that error appears in the above—identified patent and that said Letters Patent is hereby corrected as shown below:

In column 1, lines 39 and 40, between the words "honeycomb" and "having", insert --structure--.

In column 2, line 10, "suspened" should be --suspend--.

In column 6, line 19, "out" should be --our--.

Signed and Sealed this

Ninth Day of March 1982

[SEAL]

Attest:

GERALD J. MOSSINGHOFF

*Attesting Officer*　　*Commissioner of Patents and Trademarks*